(12) United States Patent
Chen et al.

(10) Patent No.: US 9,763,246 B2
(45) Date of Patent: Sep. 12, 2017

(54) TRANSPORT BLOCK SIZE DETERMINATION IN NEW CARRIER TYPE IN LTE

(71) Applicant: QUALCOMM Incorporated, San Diego, CA (US)

(72) Inventors: Wanshi Chen, San Diego, CA (US); Tao Luo, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 13/914,444

(22) Filed: Jun. 10, 2013

(65) Prior Publication Data

US 2013/0329661 A1 Dec. 12, 2013

Related U.S. Application Data

(60) Provisional application No. 61/658,809, filed on Jun. 12, 2012.

(51) Int. Cl.
*H04W 72/04* (2009.01)
*H04L 1/00* (2006.01)
(Continued)

(52) U.S. Cl.
CPC ....... *H04W 72/0453* (2013.01); *H04L 1/0026* (2013.01); *H04L 1/0028* (2013.01);
(Continued)

(58) Field of Classification Search
CPC ... H04L 5/0023; H04L 5/0035; H04L 1/0026; H04L 1/0028; H04L 27/2601;
(Continued)

(56) References Cited

U.S. PATENT DOCUMENTS

2007/0168841 A1 7/2007 Lakkis
2009/0252104 A1 10/2009 Zhang et al.
(Continued)

FOREIGN PATENT DOCUMENTS

CN 101651515 A 2/2010
CN 102057642 A 5/2011
(Continued)

OTHER PUBLICATIONS

Partial International Search Report—PCT/US2013/045085—ISA/EPO—Aug. 21, 2013.
(Continued)

*Primary Examiner* — Michael Thier
*Assistant Examiner* — Rownak Islam
(74) *Attorney, Agent, or Firm* — Arent Fox LLP

(57) ABSTRACT

A method, an apparatus, and a computer program product for wireless communication are provided. The apparatus detects a carrier type for receiving a signal, determines a transport block size (TBS) based on the detected carrier type, and receives the signal according to the determined TBS. The apparatus further detects a carrier type for receiving a signal, determines channel quality information (CQI) based on the detected carrier type, and transmits the CQI. The apparatus also determines a carrier type for transmitting a signal, determines a transport block size (TBS) based on the carrier type, and transmits the signal according to the determined carrier type and TBS. The apparatus further determines a carrier type for transmitting a signal, transmits the signal according to the determined carrier type, and receives channel quality information (CQI) from a user equipment (UE) based on the carrier type.

74 Claims, 15 Drawing Sheets

(51) Int. Cl.
  *H04L 27/00* (2006.01)
  *H04L 27/26* (2006.01)
(52) U.S. Cl.
  CPC .......... *H04L 1/0035* (2013.01); *H04L 1/0039* (2013.01); *H04L 27/0008* (2013.01); *H04L 27/2626* (2013.01); *H04W 72/04* (2013.01); *H04W 72/0446* (2013.01)
(58) Field of Classification Search
  CPC ............... H04L 27/2626; H04L 1/0035; H04L 27/0008; H04L 1/0039; H04L 27/262; H04W 72/042; H04W 72/0453; H04W 72/0446; H04W 72/04
  USPC .......................................... 370/329, 330, 328
  See application file for complete search history.

(56) References Cited

U.S. PATENT DOCUMENTS

| | | | |
|---|---|---|---|
| 2011/0090808 A1* | 4/2011 | Chen | H04B 7/15542 370/252 |
| 2011/0317615 A1* | 12/2011 | Soong | H04W 72/042 370/315 |
| 2012/0020308 A1* | 1/2012 | Li | H04L 5/0007 370/329 |
| 2012/0051209 A1* | 3/2012 | Sun | H04J 13/18 370/208 |
| 2012/0155435 A1 | 6/2012 | Wang et al. | |
| 2013/0039327 A1 | 2/2013 | Gao et al. | |
| 2013/0083666 A1 | 4/2013 | Gaal | |
| 2013/0094425 A1 | 4/2013 | Soriaga et al. | |
| 2013/0163538 A1* | 6/2013 | Kuo | H04W 72/04 370/329 |
| 2013/0183987 A1* | 7/2013 | Vrzic | H04L 1/0046 455/450 |
| 2013/0195052 A1* | 8/2013 | Ahmadi | 370/329 |
| 2013/0242882 A1* | 9/2013 | Blankenship | H04W 72/042 370/329 |
| 2013/0308504 A1* | 11/2013 | Nimbalker | H04L 5/003 370/281 |
| 2014/0355558 A1 | 12/2014 | Zhang et al. | |
| 2015/0043457 A1* | 2/2015 | Liu | H04B 7/024 370/329 |
| 2015/0071201 A1* | 3/2015 | Larsson | H04W 72/02 370/329 |

FOREIGN PATENT DOCUMENTS

| | | |
|---|---|---|
| CN | 102448122 A | 5/2012 |
| EP | 2306782 A1 | 4/2011 |
| JP | 2013509037 A | 3/2013 |
| JP | 2015510300 A | 4/2015 |
| WO | 2011047253 A1 | 4/2011 |

OTHER PUBLICATIONS

International Search Report and Written Opinion—PCT/US2013/045085—ISA/EPO—Nov. 22, 2013.

* cited by examiner

TRANSPORT BLOCK SIZE DETERMINATION IN NEW CARRIER TYPE IN LTE

CROSS-REFERENCE TO RELATED APPLICATION(S)

This application claims the benefit of U.S. Provisional Application Ser. No. 61/658,809, entitled "TRANSPORT BLOCK SIZE DETERMINATION IN NEW CARRIER TYPE IN LTE" and filed on Jun. 12, 2012, which is expressly incorporated by reference herein in its entirety.

BACKGROUND

Field

The present disclosure relates generally to communication systems, and more particularly, to determining a transport block size in a new carrier type of a LTE communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product for wireless communication are provided. The apparatus detects a carrier type for receiving a signal, determines a transport block size (TBS) based on the detected carrier type, and receives the signal according to the determined TBS.

In another aspect of the disclosure, the apparatus detects a carrier type for receiving a signal, determines channel quality information (CQI) based on the detected carrier type, and transmits the CQI.

In a further aspect of the disclosure, the apparatus determines a carrier type for transmitting a signal, determines a transport block size (TBS) based on the carrier type, and transmits the signal according to the determined carrier type and TBS.

In yet another aspect of the disclosure, the apparatus determines a carrier type for transmitting a signal, transmits the signal according to the determined carrier type, and receives channel quality information (CQI) from a user equipment (UE) based on the carrier type.

DETAILED DESCRIPTION

Figure 1:
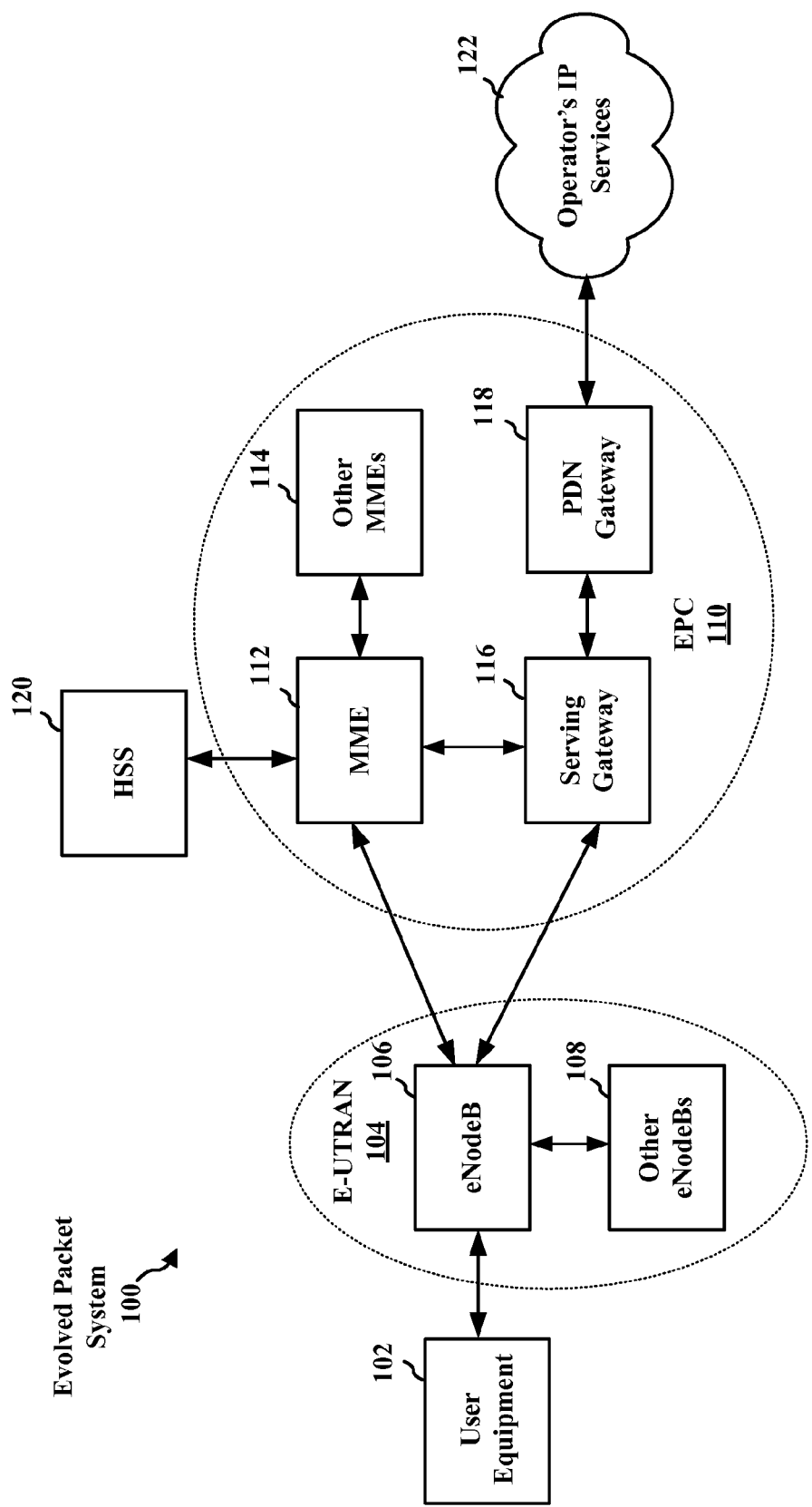
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
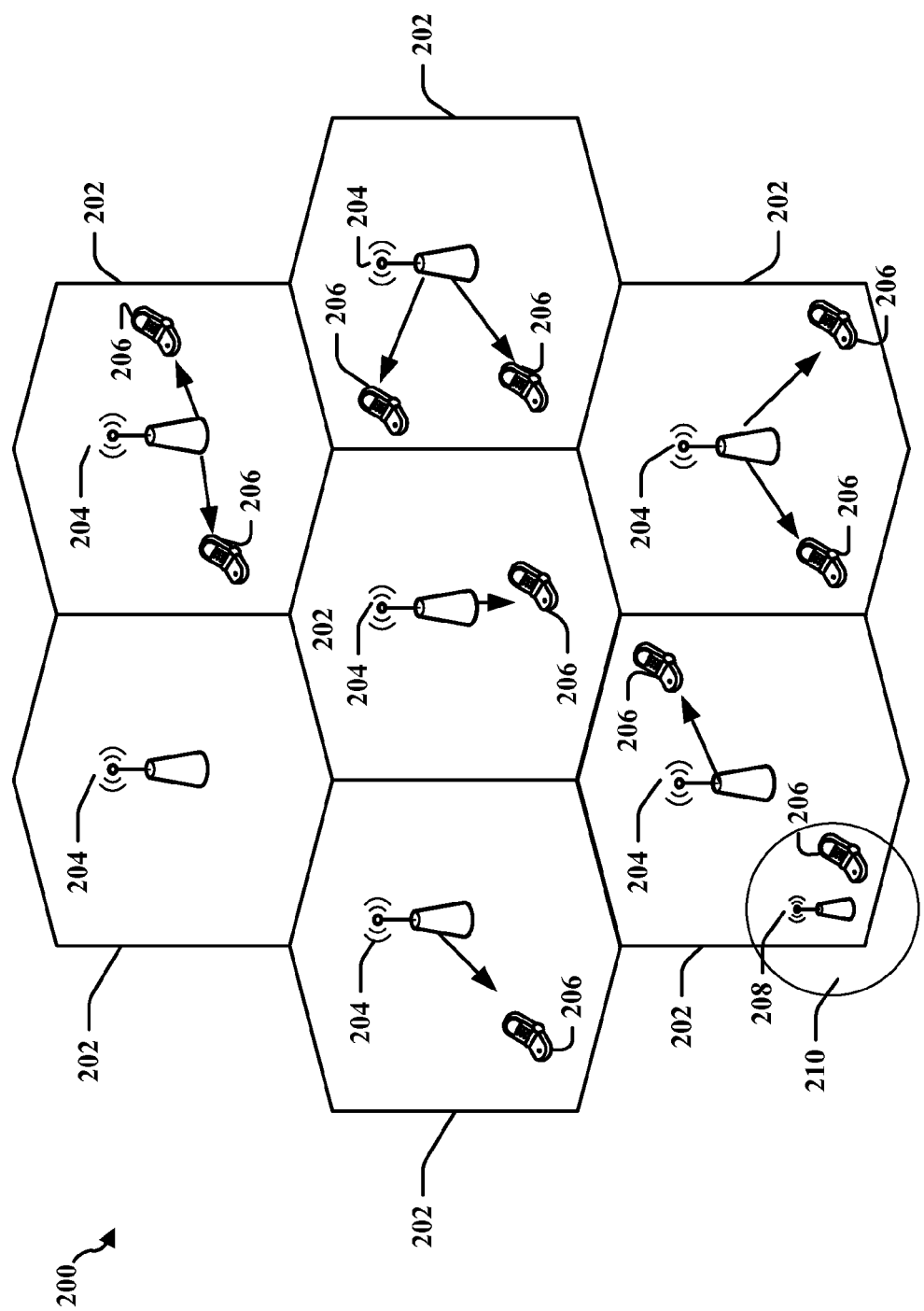
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
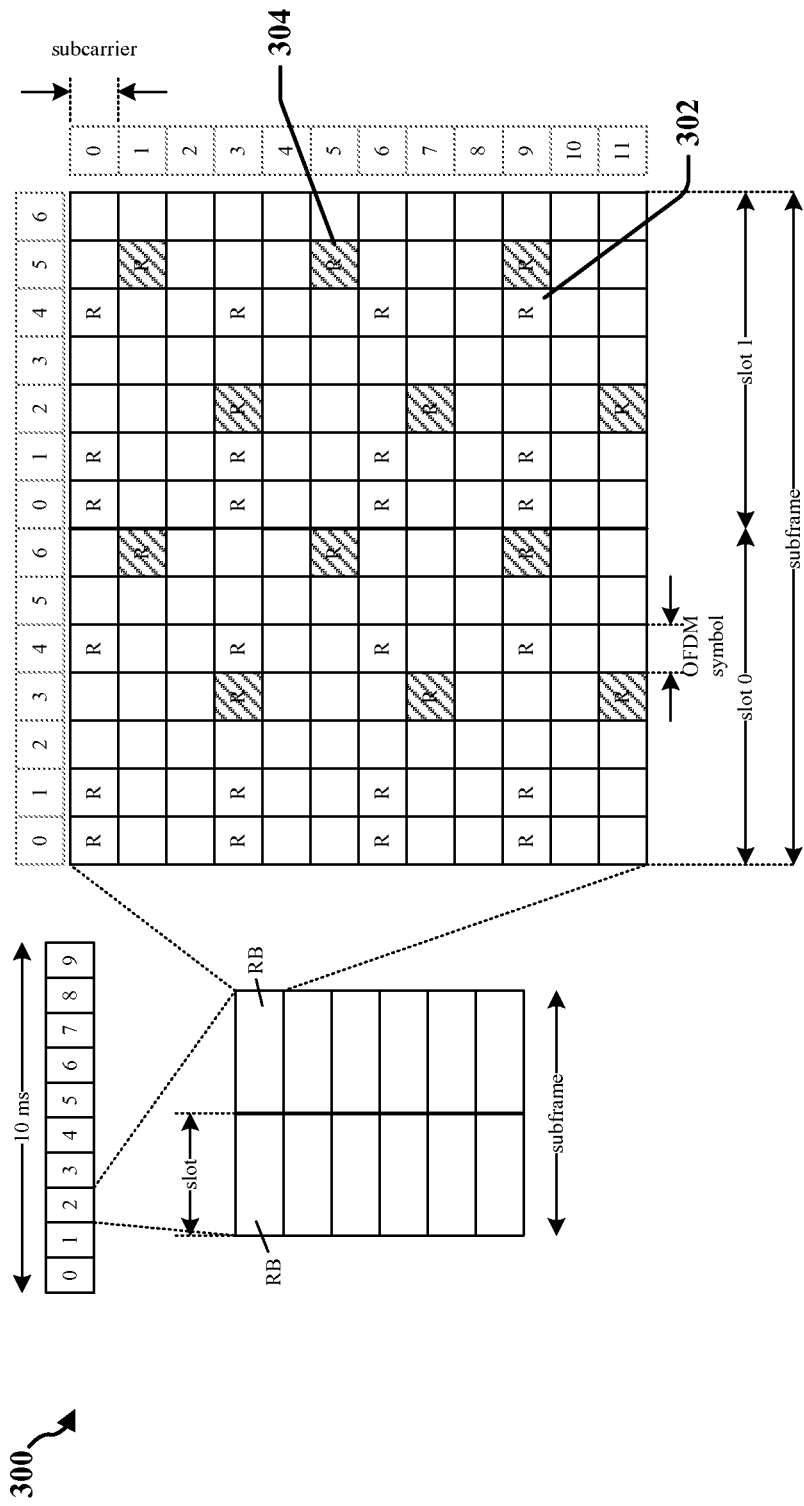
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
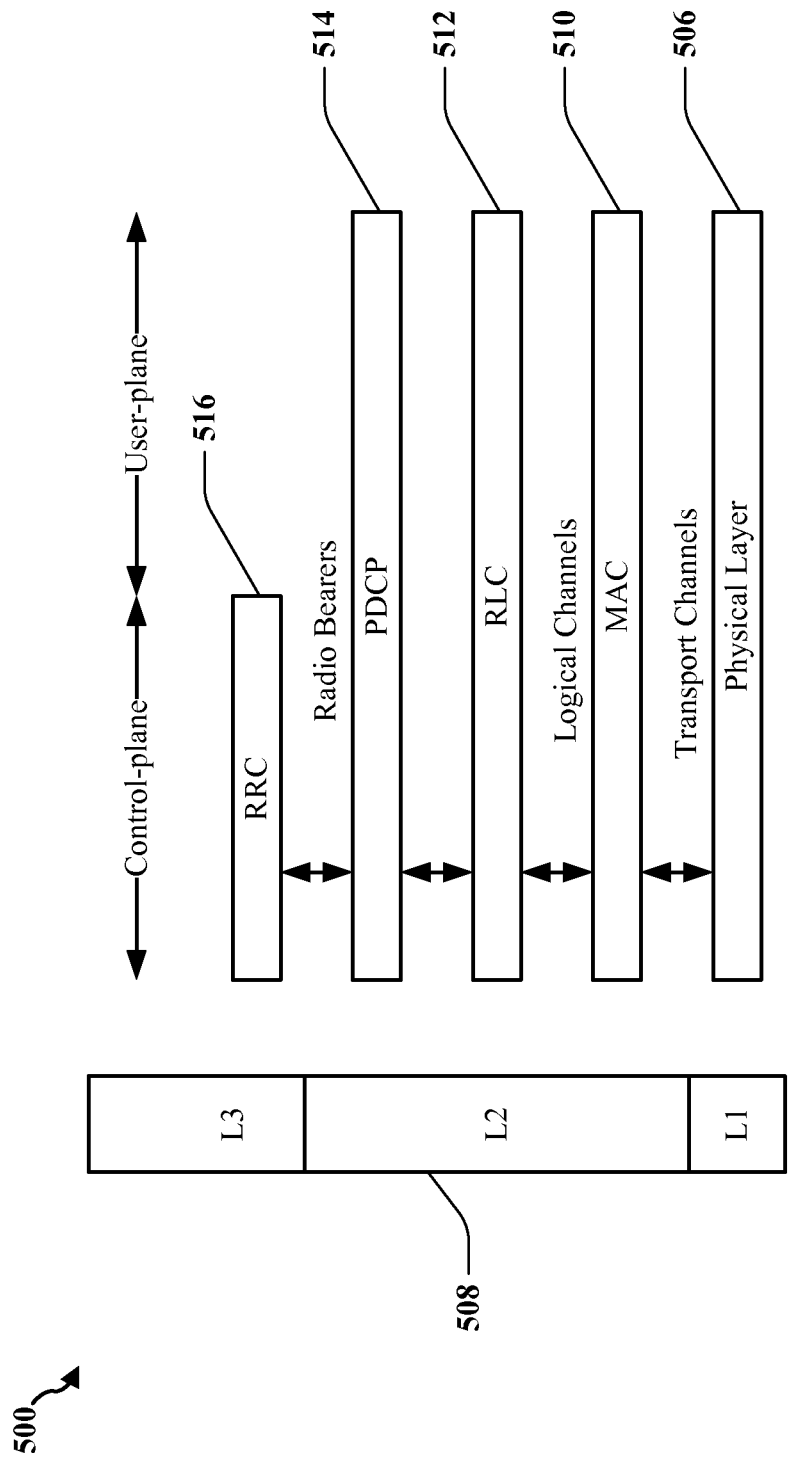
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
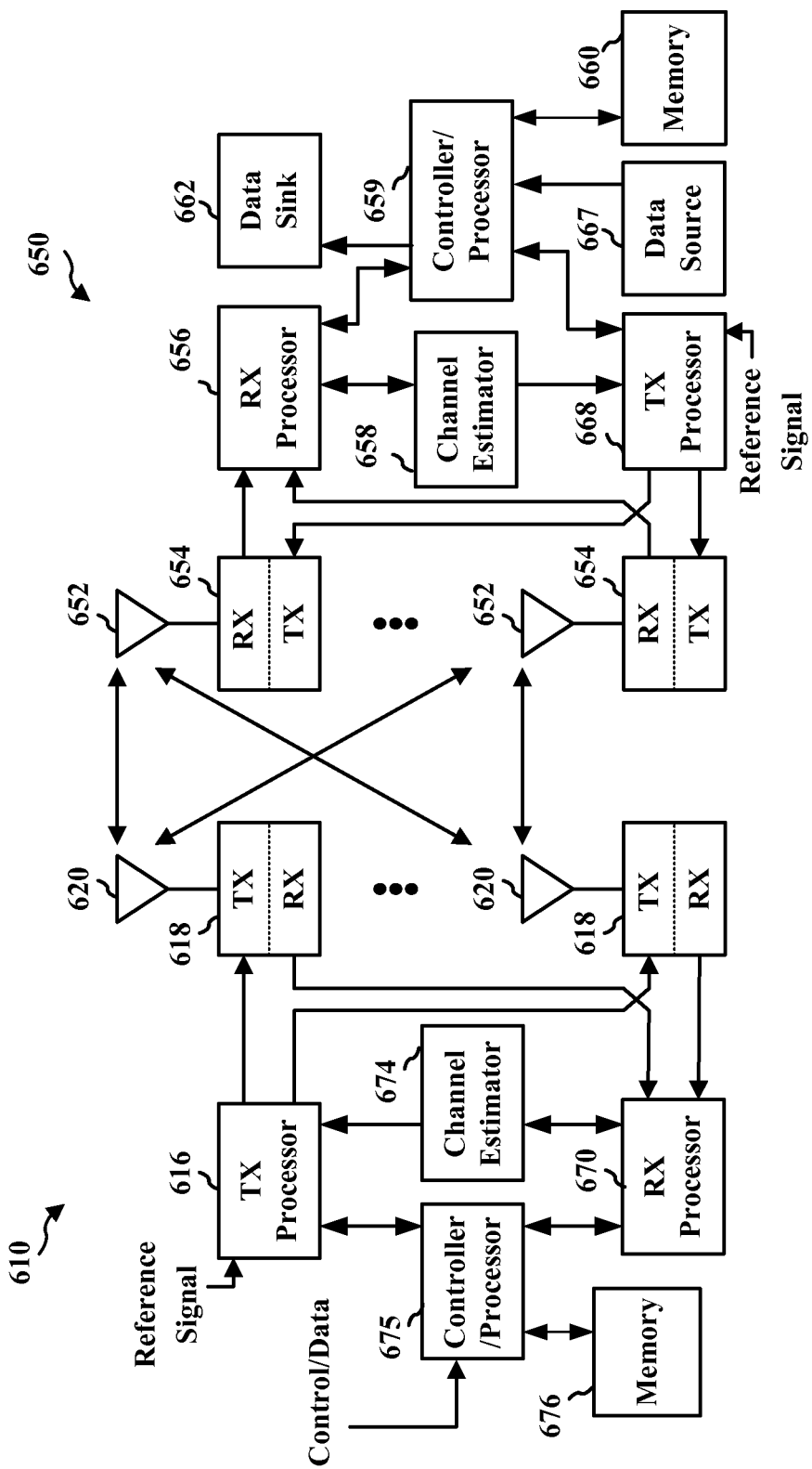
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
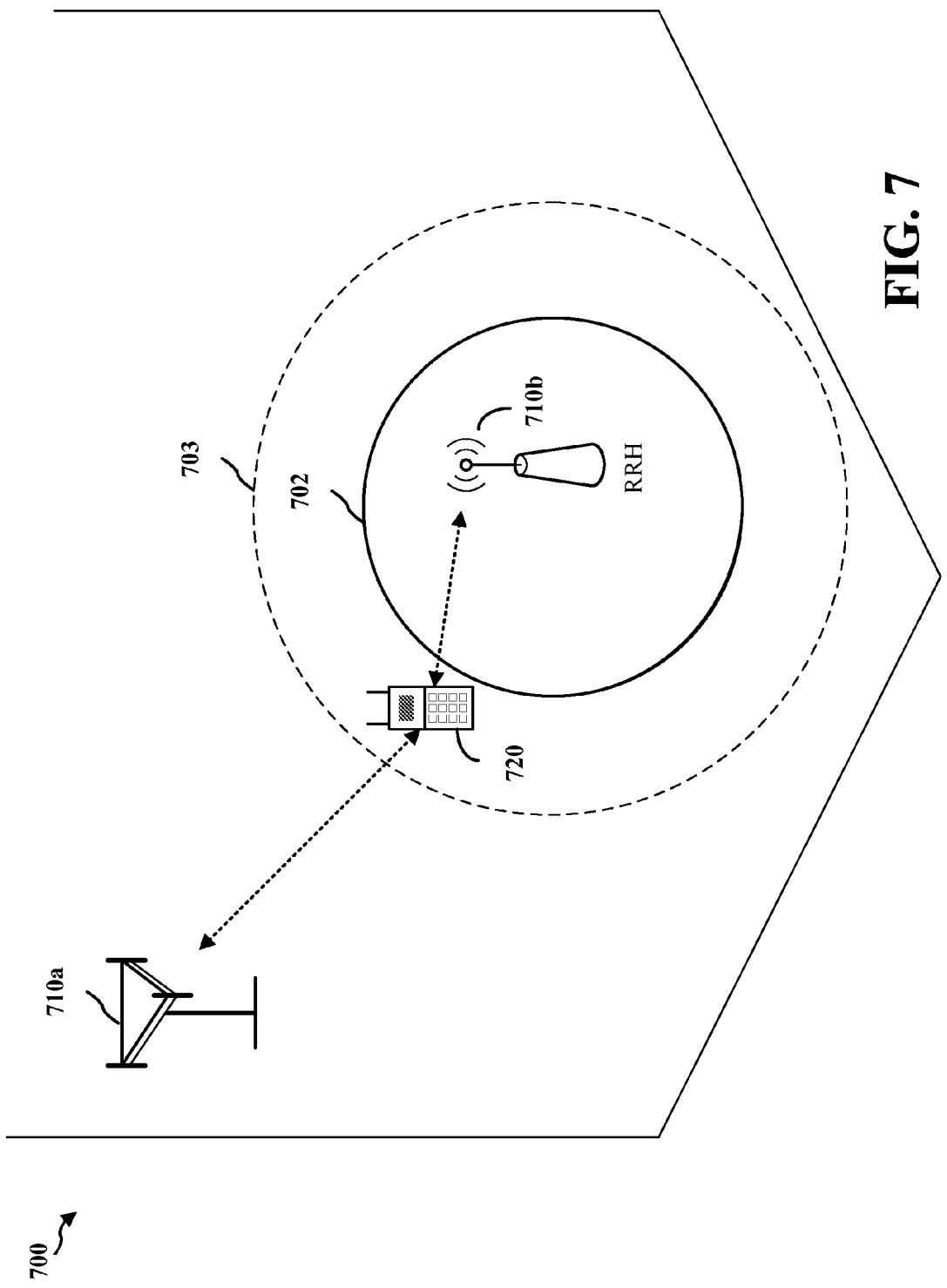
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

In LTE Release 8, 9, or 10 (Rel-8/9/10), a transport block size (TBS) for downlink and uplink data transmissions is determined based on two factors: 1) a resource allocation size ($N_{PRB}'$); and 2) a modulation and coding scheme (MCS) index.

The resource allocation size $N_{PRB}'$ can be up to 100 resource blocks (RBs) for 20 MHz. The resource allocation size may be mapped to an index $N_{PRB}$. For regular downlink subframes, $N_{PRB}=N_{PRB}'$. For special subframes in time division duplex (TDD), an adjustment factor of 0.75 may be applied since the number of OFDM symbols in a downlink pilot time slot (DwPTS) of special subframes is less than that of regular downlink subframes, i.e., $N_{PRB}=\max\{\lfloor N_{PRB}'\times 0.75\rfloor, 1\}$. Another adjustment factor having a value of less than 1 may be provided in LTE Release 11 (Rel-11) due to a new special subframe configuration.

The MCS index may be mapped to a TBS index ($I_{TBS}$) ranging from 0 to 26. The resource allocation size and MCS index may be determined based on downlink (DL) and/or uplink (UL) grants, e.g., for semi-persistent scheduling (SPS), based on the SPS activation PDCCH.

A TBS table may be defined with rows indexed by $I_{TBS}$ and columns indexed by $N_{PRB}$. For future compatibility, the TBS table may have $N_{PRB}$ up to 110 RBs. The TBS table may be constructed based on the following: 1) highest code rate is chosen close to 0.92 (e.g., a UE may skip PDSCH decoding if the coding rate is 0.93 or higher); 2) TBS table design is based on CQI MCS values; and 3) TBS computed from the MCS assuming n=3 OFDM symbols for control, two antennas, and 120 resource elements per physical resource block (120 REs/PRB). Thus, a single MCS table is invariant to a number of Tx antennas, PCFICH (n), and cyclic prefix (CP) size. Table 1 below shows an example of a TBS table.

TABLE 1

| MCS Index | Modulation | Coding Rate x 1024 | Efficiency | Comments | Code Rate |
|---|---|---|---|---|---|
| 0 | 2 | 120 | 0.2344 | From CQI Table | 0.1171875 |
| 1 | 2 | 157 | 0.3057 | Average Efficiency | 0.15332031 |
| 2 | 2 | 193 | 0.377 | From CQI Table | 0.18847656 |
| 3 | 2 | 251 | 0.4893 | Average Efficiency | 0.24511719 |
| 4 | 2 | 308 | 0.6016 | From CQI Table | 0.30078125 |
| 5 | 2 | 379 | 0.7393 | Average Efficiency | 0.37011719 |

TABLE 1-continued

| MCS Index | Modulation | Coding Rate x 1024 | Efficiency | Comments | Code Rate |
|---|---|---|---|---|---|
| 6 | 2 | 449 | 0.877 | From CQI Table | 0.43847656 |
| 7 | 2 | 526 | 1.0264 | Average Efficiency | 0.51367188 |
| 8 | 2 | 602 | 1.1758 | From CQI Table | 0.58789063 |
| 9 | 2 | 679 | 1.3262 | Average Efficiency | 0.66308594 |
| 10 | 4 | 340 | 1.3262 | Overlap | 0.33203125 |
| 11 | 4 | 378 | 1.4766 | From CQI Table | 0.36914063 |
| 12 | 4 | 434 | 1.69535 | Average Efficiency | 0.42382813 |
| 13 | 4 | 490 | 1.9141 | From CQI Table | 0.47851563 |
| 14 | 4 | 553 | 2.1602 | Average Efficiency | 0.54003906 |
| 15 | 4 | 616 | 2.4063 | From CQI Table | 0.6015625 |
| 16 | 4 | 658 | 2.5684 | Average Efficiency | 0.64257813 |
| 17 | 6 | 438 | 2.5684 | Overlap | 0.42773438 |
| 18 | 6 | 466 | 2.7305 | From CQI Table | 0.45507813 |
| 19 | 6 | 517 | 3.0264 | Average Efficiency | 0.50488281 |
| 20 | 6 | 567 | 3.3223 | From CQI Table | 0.55371094 |
| 21 | 6 | 616 | 3.6123 | Average Efficiency | 0.6015625 |
| 22 | 6 | 666 | 3.9023 | From CQI Table | 0.65039063 |
| 23 | 6 | 719 | 4.21285 | Average Efficiency | 0.70214844 |
| 24 | 6 | 772 | 4.5234 | From CQI Table | 0.75390625 |
| 25 | 6 | 822 | 4.8193 | Average Efficiency | 0.80273438 |
| 26 | 6 | 873 | 5.1152 | From CQI Table | 0.85253906 |
| 27 | 6 | 910 | 5.33495 | Average Efficiency | 0.88867188 |
| 28 | 6 | 948 | 5.5547 | From CQI Table | 0.92578125 |
| 29 | | | | Implicit TBS Signaling with QPSK | |
| 30 | | | | Implicit TBS Signaling with 16QAM | |
| 31 | | | | Implicit TBS Signaling with 64QAM | |

The CQI index may be derived based on the following factors: 1) the first three OFDM symbols of a subframe are occupied by control signaling; 2) no resource elements (REs) used by primary or secondary synchronization signals or PBCH; 3) cyclic prefix (CP) length of non-MBSFN subframes; 4) redundancy version 0; 5) no REs allocated for channel state information reference signals (CSI-RS) and zero-power CSI-RS; 6) no REs allocated for PRS; and 7) other factors (e.g., a certain PDSCH transmission scheme or a certain traffic-to-pilot ratio for CRS-based PDSCH).

In LTE Rel-8/9/10, PDCCH is located in the first several symbols in a subframe. The PDCCH may be fully distributed across an entire system bandwidth. The PDCCH may be time-division multiplexed with PDSCH. Effectively, a subframe is divided into a control region and a data region.

In LTE Rel-11, new control signaling (e.g., enhanced PDCCH (ePDCCH)) may be provided. Unlike a legacy PDCCH, which occupies the first several control symbols in a subframe, ePDCCH occupies the data region, similar to PDSCH. ePDCCH messages span both first and second slots (e.g., frequency division multiplexed (FDM)-based ePDCCH).

In LTE Rel-11 and later, a new carrier type (NCT) may be provided. The NCT may not necessarily be backward compatible. In the NCT, CRS may only be present in a subset of subframes (e.g., present in every five subframes). CRS may be limited to 1-port only, and may be present only in a subset of a system bandwidth (e.g., only in 25 RBs of a system bandwidth of 100 RBs). This reduces DL overhead and provides energy savings for the eNB, etc.

In LTE Rel-11, the NCT may be associated with a backward compatible carrier as part of carrier aggregation. A carrier of the NCT may not be a standalone carrier in LTE Rel-11. However, this constraint may be relaxed in future releases such that a carrier of the NCT may be a standalone carrier. The NCT may not have a legacy control region, at least in some subframes, if not in all subframes. The NCT may completely rely on ePDCCH (and potentially ePC-FICH/ePHICH, etc.) for necessary control signaling or control signaling from another carrier.

In LTE Rel-12 and beyond, demodulation reference signal (DM-RS) bundling may be provided. This may be applied where DM-RS is present in a subset of RBs assigned to PDSCH for a UE, and/or present in a subset of subframes assigned PDSCH for a UE. DM-RS of one subframe can be used for another subframe, or DM-RS of one RB can be used for another RB, etc. This may be reasonable if the channel coherence time and/or coherence bandwidth is large enough. When DM-RS bundling is provided, DM-RS overhead is reduced. The overhead may be zero for some subframes and/or some RBs.

Problems arise with respect to determining a TBS in the NCT. For example, the NCT may influence link inefficiency when a predetermined number of REs/PRB is assumed for TBS determination. Accordingly, solutions are provided for determining the TBS in the NCT more efficiently.

For example, when determining the TBS, an assumption of 120 REs/PRB may be too conservative for the NCT. For a subframe without CRS, CSI-RS, and either 0, 12 or 24 REs/PRB for DM-RS, the number of REs/PRB available for PDSCH for a normal CP may be calculated as follows:

1) 14 (symbols)*12 (tones/PRB)–0 (number of DM-RS REs overhead)=168 REs;

2) 14 (symbols)*12 (tones/PRB)–12 (number of DM-RS REs overhead)=156 REs; or 3) 14 (symbols)*12 (tones/PRB)–24 (number of DM-RS REs overhead)=144 REs.

Comparing the above calculations with the assumed case of 120 REs/PRB, a 20 to 40% difference is realized.

As a result, the original maximum coding rate of 0.92 assuming 120 REs/PRB now corresponds to a maximum coding rate of: 1) 0.92*120/168=0.66; 2) 0.92*120/156=0.71; or 3) 0.92*120/144=0.77. This results in link inefficiency when a higher coding rate can be supported.

Similarly, problems may arise for CQI derivation in the NCT. For example, the assumption of three control symbols for the NCT may not be appropriate. However, a possible solution is for the eNB to alleviate the impact by adjusting the CQI value based on the actual number of REs/PRB with respect to the assumed number of REs/PRB.

To help solve inefficient TBS determination in the NCT (as described above, for example), an adjustment factor having a value greater than 1 may be provided to account for the absence of a legacy control region and/or CRS (at least in some subframes) and/or DM-RS overhead. A single factor may be provided regardless of CP length, subframe type, 0, 12 or 24 DM-RS REs, etc.

More than one adjustment factor may also be provided. For example, one factor may be provided for rank 1 or 2 PDSCH, and another factor may be provided for rank 3 and above, etc. In another example, one factor may be provided for regular downlink subframes and one or more factors may be provided for special subframes in TDD potentially depending on the special subframe configuration. This is because the impact of removing legacy control/CRS may be different for regular subframes and special subframe configurations. In another example, one factor may be provided for downlink subframes containing channel state information reference signal (CSI-RS) and one or more factors may be provided for subframes not containing CSI-RS.

In particular, if a special subframe has six downlink pilot timeslot (DwPTS) symbols, removing two legacy control symbols roughly provides a 50% increase of the number of REs for PDSCH (from four symbols to six symbols). Meanwhile, if a special subframe has 12 DwPTS symbols, removing a legacy control region increases the number of PDSCH REs by approximately 20% (from 10 symbols to 12 symbols).

The adjustment factor may be applicable to downlink data transmissions. Also, a new adjustment factor may also be defined for uplink data transmission. In one example, a new adjustment factor may be implemented for an uplink data transmission if DM-RS for PUSCH is bundled (i.e., DM-RS is only present in a subset of subframes and/or RBs). The adjustment factor for uplink may be differently defined compared with the adjustment factor for downlink.

The adjustment factor may be applicable for all MCS values, all number of layers, etc. However, the adjustment factor may also only be enabled for a subset of MCS, e.g., only for 64-QAM.

The applicability of the adjustment factor may be for all downlink control information (DCI) formats, search spaces (common vs. UE-specific), subframes (e.g., CRS subframes vs. CRS-less subframes), control channel types (PDCCH vs. ePDCCH), PDSCH types (e.g., broadcast vs. unicast), etc. The adjustment factor may be applicable for only a subset of the above-described factors, especially for a fallback operation. For example, the adjustment factor may only be applicable for unicast but not for broadcast; for PDSCH scheduled by a UE-specific search space but not for PDSCH scheduled by a common search space; or CRS-less subframes but not for CRS subframes, etc.

The adjustment factor may be applied by modifying the mapping from $N_{PRB}'$ to $N_{PRB}$. For example, $N_{PRB}$=min {ceiling ($\alpha*N_{PRB}'$), 110}, e.g., $\alpha$=1.2, and wherein $N_{PRB}'$ is an assigned resource allocation size.

Alternatively, the adjustment factor may be applied by modifying the TBS size directly. For example, TBS=ceiling $(f(I_{TBS}, N_{PRB})*\alpha/8)*8$, where the number 8 ensures the TBS is in units of bytes. A different number may be used for any other units.

Alternatively, a new TBS table may be defined. For example, additional transition TBS sizes between QPSK vs. 16QAM, 16QAM vs. 64QAM, and peak rate handling may be provided considering a new number of REs/PRB pair. This approach increases the peak rate.

Currently, a maximum TBS size per layer is 75,376. Assuming a 0.92 maximum coding rate, one RB for ePDCCH, 64QAM, and 20 MHz (100 RBs), an adjusted maximum TBS per layer may be calculated as follows:

1) For the case of 0 DM-RS REs: maximum TBS=0.92 (max coding rate)*(100–1) (RBs)*6 (mod order)*(14*12) =91,808. This is an increase of 21.8% from the current maximum 75,376.

2) For rank 1 or rank 2 PDSCH (12 DM-RS REs): maximum TBS=0.92 (max coding rate)*(100–1) (RBs)*6 (mod order)*(14*12–12)=85,250. This, is an increase of 13.1% from the current maximum 75,376.

3) For rank 3 and above PDSCH (24 DM-RS REs): maximum TBS=0.92*(100−1)*6*(14*12−24)=78,693. This is an increase of 4.4% from the current maximum 75,376.

The adjustment factor may be applied by implementing a combination of approaches. For example, when multiple approaches for applying the adjustment factor exist, a UE may be informed of which approach to use. In another example, a first approach to use is pre-defined. Accordingly, a second approach may be used when a MCS and/or resource allocation size reach a certain threshold. Otherwise, the first approach is used.

Applying the adjustment factor may be automatically enabled for all UEs. For example, upon detecting that the carrier is the NCT, the UE may determine the TBS based on a new adjustment factor for all unicast traffic scheduling in a UE-specific search space. Alternatively, applying the adjustment factor may be enabled for a UE by signaling. For example, the enabling signal may be a RRC signal or a dynamic signal via ePDCCH (e.g., a 1 or 2-bit information field).

The TBS may be adjusted to account for a multi-layer transmission. The combination of $I_{TBS}$ and $N_{PRB}$ may determine a per-layer TBS. For multi-layer transmission per transport block (2, 3 or 4 layers), a TBS may be derived based on the single-layer TBS and the number of layers (e.g., approximately a single layer TBS*number of layers).

The adjustment factor may impact the single layer TBS determination (which implicitly impacts the multi-layer TBS determination). Potentially, new table entries may be provided, e.g., for higher peak rates.

Alternatively, the adjustment factor may directly impact the multi-layer TBS determination. For example, the TBS may be calculated as follows: TBS=single layer TBS*number of layers*β, where β is an adjustment factor.

For low cost UEs, the adjustment factor (scaling factor) may not be applied. In other words, the new scaling factor may be UE category dependent. In addition, a new TBS table may be separately defined by low cost UEs. For example, the new TBS table may follow the same mechanism as a TBS look-up table for broadcast messages, where the TBS size can be indexed by one-bit indexing two columns, and can be optimized assuming QPSK and the corresponding traffic needs of low cost UEs.

The starting PDSCH symbol may not start from zero. For example, the starting PDSCH symbol may start from the fourth symbol of the first slot considering the co-existence of a legacy carrier type and a new carrier type in the same carrier frequency. In such a case, the adjustment factor may not be applied. Alternatively, a different adjustment factor may be applied by taking into account the starting PDSCH symbol.

For carrier aggregation, the adjusted TBS operation may be independently operated. The operation of whether to enable adjustment, the actual value(s) of the adjustment factor, etc., may be independently performed. For example, a component carrier of a legacy carrier type may be provided without the adjustment factor, while a component carrier with a new carrier type may be provided with the adjustment factor. For CQI determination, the UE may assume the absence of a legacy control region.

In an aspect, a UE may determine a legacy carrier type versus a new carrier type in an explicit or implicit manner. Explicit determination may be based on explicit signaling from a serving cell or different cell. The explicit signaling may be a broadcast message or unicast message. In one example of explicit determination, a UE in carrier aggregation may receive indication that a secondary cell in carrier aggregation is the new carrier type. In another example of explicit determination, an information field may be present in PBCH to indicate whether a cell is of the legacy carrier type or new carrier type. Implicit determination may be based on different physical layer characteristics associated with the legacy carrier type and the new carrier type. In one example of implicit determination, a primary synchronization signal (PSS) and/or a secondary synchronization signal (SSS) of the new carrier type may be differently located compared with the legacy carrier type. As a result, the UE can determine whether a cell is of the legacy or new carrier type by detecting different arrangements of the PSS and/or SSS. In another example of implicit determination, the new carrier type may carry a new PBCH design, different from a legacy PBCH design in the legacy carrier type. As a result, a UE may determine that a cell is of the new carrier type if the new PBCH design is detected. In yet another example of implicit determination, CRS may be decimated at least in time in the new carrier type (e.g., only transmitted every 5 subframes). Hence, the UE may determine that a cell is of the new carrier type if CRS of the cell is determined to be decimated.

Figure 8:
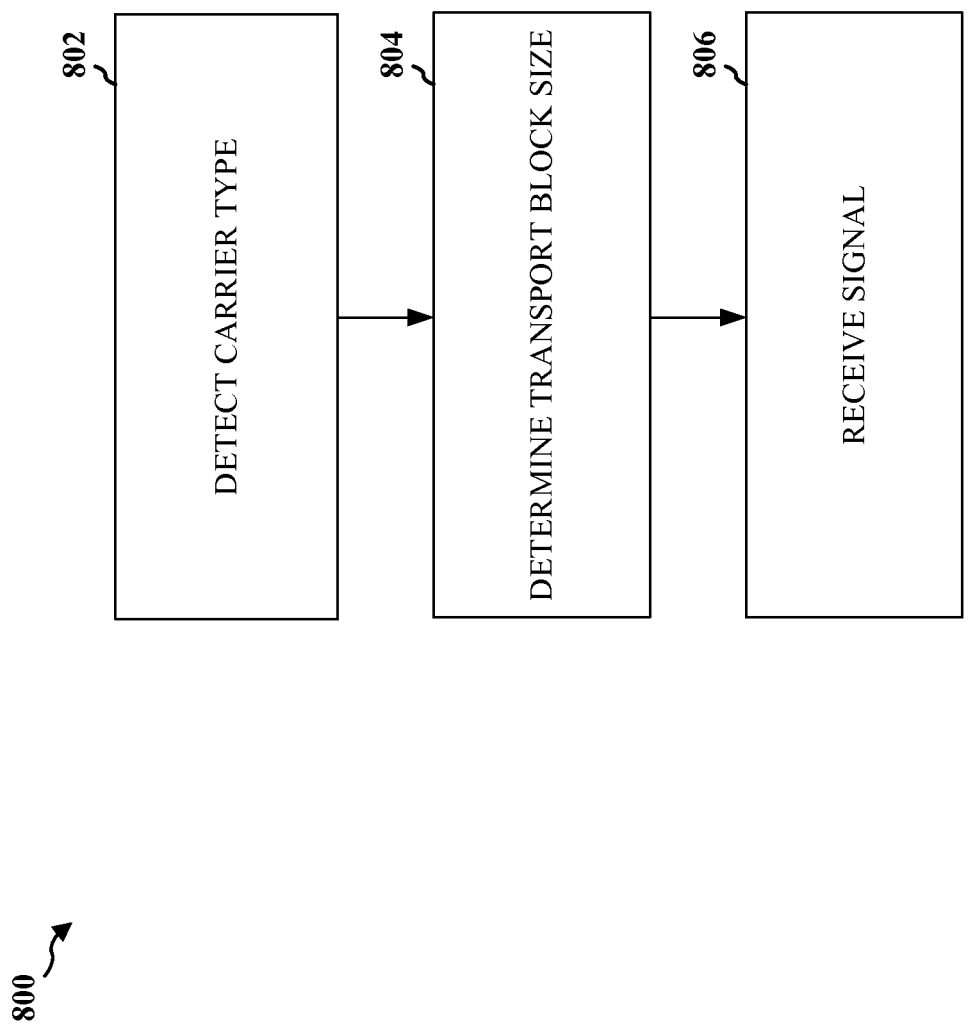
FIG. 8 is a flow chart of a method of wireless communication.

FIG. 8 is a flow chart 800 of a method of wireless communication. The method may be performed by a UE. At step 802, the UE detects (e.g., determines) a carrier type for receiving a signal. In one example, the UE may detect the carrier type using one or more of the techniques described in the preceding paragraph. At step 804, the UE determines a transport block size (TBS) based at least in part on the detected carrier type. At step 806, the UE receives the signal according to the determined TBS.

The TBS may be determined based on a first scheme for a first detected carrier type, and determined based on a second scheme for a second detected carrier type. The first scheme may include at least a first TBS look-up table, and the second scheme may include at least a second TBS look-up table different from the first TBS look-up table. The first detected carrier type may be a legacy carrier type (e.g., LTE Rel-8/9/10 carrier type). The second detected carrier type may be a new carrier type (NCT) (e.g., LTE Rel-11 or later carrier type).

The second scheme for TBS determination may be automatically enabled for all user equipments (UEs) in a cell of the second carrier type. Alternatively, the second scheme for TBS determination may be enabled via a signal in a cell of the second carrier type. The enabling signal may be a user equipment (UE)-specific signal or a cell-specific signal.

The determining of the TBS based at least in part on the detected carrier type may include determining a TBS scheme based on at least two different TBS schemes for a same subframe type in a cell. The subframe type may be at least one of a normal downlink subframe, a normal uplink subframe, or a special subframe, wherein the special subframe includes both downlink and uplink transmissions. The determining of the TBS scheme may be further based on at least one of a downlink control information (DCI) format, a control channel type, a signal received dynamically via a downlink control channel, a physical downlink scheduling channel (PDSCH) type, a modulation order of the PDSCH, whether the signal is a unicast signal or a multicast signal, whether the PDSCH is scheduled by a user equipment (UE)-specific search space or a common search space, or whether a subframe contains a common reference signal (CRS).

A first TBS scheme may be based on a resource allocation size and a modulation and coding scheme (MCS) value, and a second TBS scheme may be based on the resource allocation size, the MCS value, and an adjustment factor, as described above. The adjustment factor may be larger than 1. The second TBS scheme may include adjusting an assigned resource allocation size according to the adjustment factor, and determining the TBS according to the adjusted resource allocation size and the MCS value. Alternatively, the second TBS scheme may include determining a first TBS according to the resource allocation size and the MCS value, and calculating an adjusted TBS by applying the adjustment factor to the determined first TBS.

Figure 9:
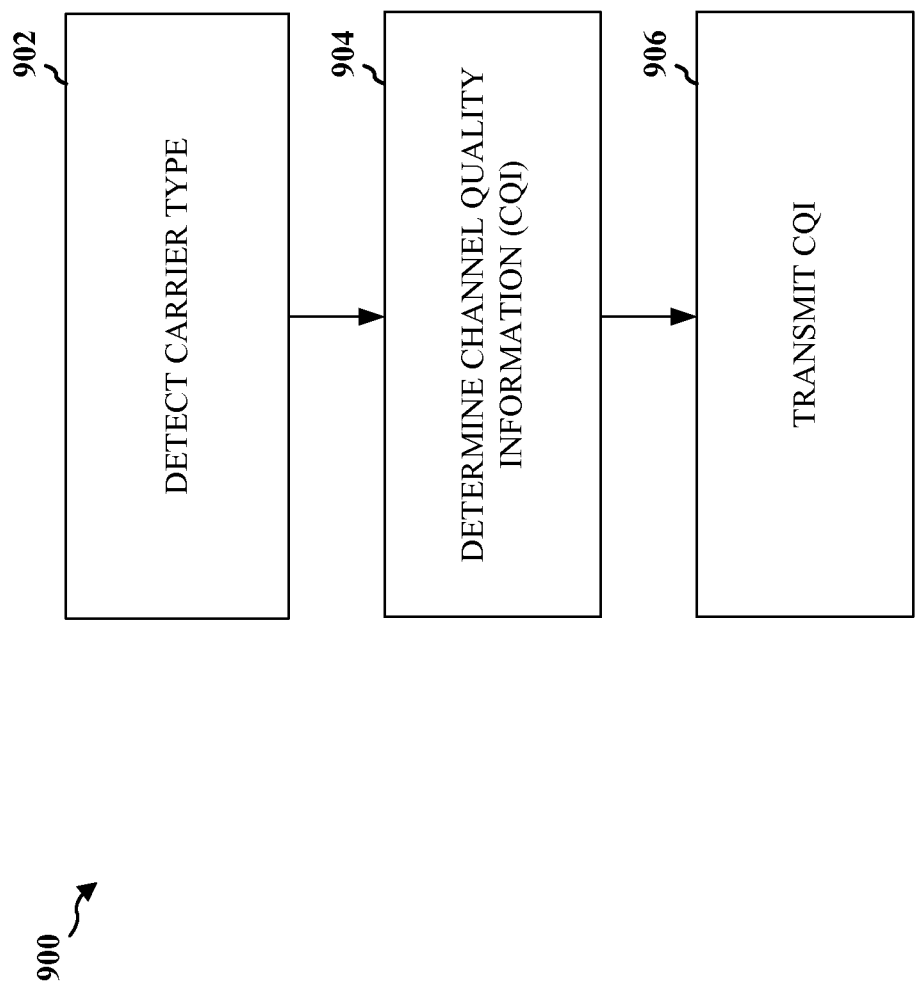
FIG. 9 is a flow chart of a method of wireless communication.

FIG. 9 is a flow chart 900 of a method of wireless communication. The method may be performed by a UE. At step 902, the UE detects a carrier type for receiving a signal. In one example, the UE may detect the carrier type using one or more of the techniques described above. At step 904, the UE determines channel quality information (CQI) based at least in part on the detected carrier type. At step 906, the UE transmits the CQI.

The CQI may be determined based on a first set of overhead assumptions for a first detected carrier type, and determined based on a second set of overhead assumptions for a second detected carrier type. The difference between the first set of overhead assumptions and the second set of overhead assumptions may include at least one of downlink control signaling or a common reference signal. The second set of overhead assumptions may be determined based on a subframe type.

The carrier type may be a new carrier type (e.g., LTE Rel-11 or later carrier type). The CQI may be determined based on a first three symbols of a subframe of the new carrier type not being occupied by control signaling.

Figure 10:
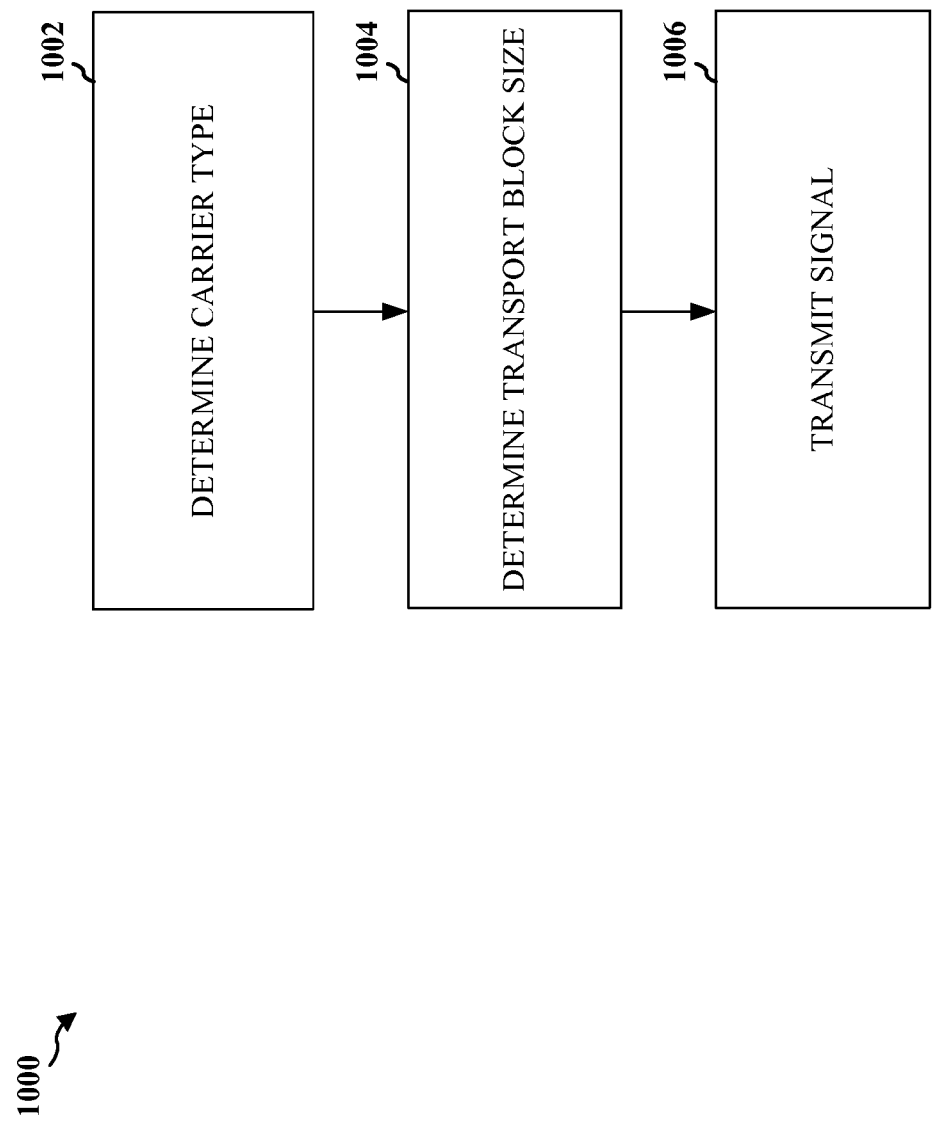
FIG. 10 is a flow chart of a method of wireless communication.

FIG. 10 is a flow chart 1000 of a method of wireless communication. The method may be performed by an eNB. At step 1002, the eNB may determine a carrier type for transmitting a signal. At step 1004, the eNB may determine a transport block size (TBS) based at least in part on the carrier type. At step 1006, the eNB may transmit the signal according to the determined carrier type and TBS.

The TBS may be determined based on a first scheme for a first carrier type, and determined based on a second scheme for a second carrier type. The first scheme may include at least a first TBS look-up table, and the second scheme may include at least a second TBS look-up table different from the first TBS look-up table. The first carrier type may be a legacy carrier type (e.g., LTE Rel-8/9/10 carrier type). The second carrier type may be a new carrier type (NCT) (e.g., LTE Rel-11 or later carrier type). The second scheme for TBS determination may be automatically enabled for all user equipments (UEs) in a cell of the second carrier type.

The eNB may transmit a signal in a cell of the second carrier type to enable the second scheme for TBS determination in a user equipment (UE). The enabling signal may be a user equipment (UE)-specific signal or a cell-specific signal.

The determining of the TBS based at least in part on the carrier type may include determining a TBS scheme based on at least two different TBS schemes for a same subframe type in a cell. The subframe type may be at least one of a normal downlink subframe, a normal uplink subframe, or a special subframe, wherein the special subframe includes both downlink and uplink transmissions. The determining of the TBS scheme may be further based on at least one of a downlink control information (DCI) format, a control channel type, a signal received dynamically via a downlink control channel, a physical downlink scheduling channel (PDSCH) type, a modulation order of the PDSCH, whether the signal is a unicast signal or a multicast signal, whether the PDSCH is scheduled by a user equipment (UE)-specific search space or a common search space, or whether a subframe contains a common reference signal (CRS).

A first TBS scheme may be based on a resource allocation size and a modulation and coding scheme (MCS) value. A second TBS scheme may be based on the resource allocation size, the MCS value, and an adjustment factor, as described above. The adjustment factor may be larger than 1. The second TBS scheme may include adjusting an assigned resource allocation size according to the adjustment factor, and determining the TBS according to the adjusted resource allocation size and the MCS value. Alternatively, the second TBS scheme may include determining a first TBS according to the resource allocation size and the MCS value, and calculating an adjusted TBS by applying the adjustment factor to the determined first TBS.

Figure 11:
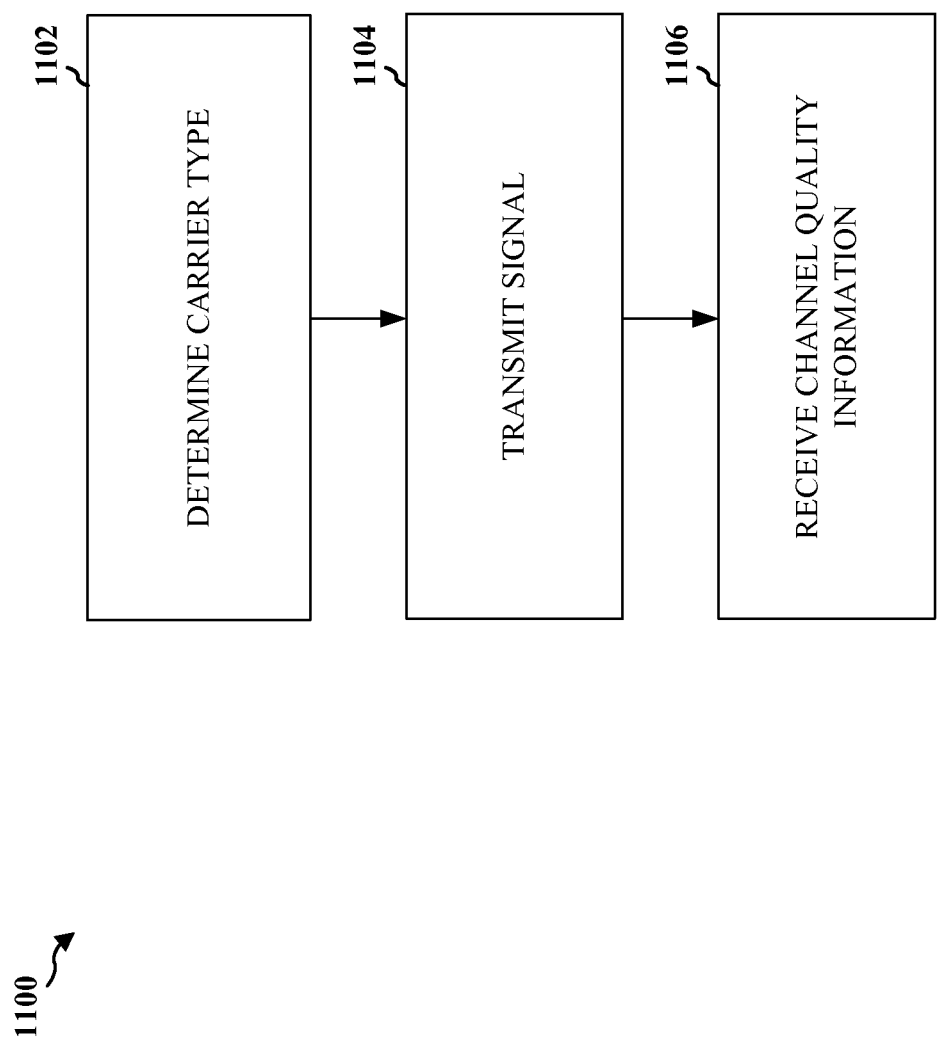
FIG. 11 is a flow chart of a method of wireless communication.

FIG. 11 is a flow chart 1100 of a method of wireless communication. The method may be performed by an eNB. At step 1102, the eNB may determine a carrier type for transmitting a signal. At step 1104, the eNB may transmit the signal according to the determined carrier type. At step 1106, the eNB may receive channel quality information (CQI) from a user equipment (UE) based at least in part on the carrier type.

The CQI may be based on a first set of overhead assumptions for a first carrier type, and based on a second set of overhead assumptions for a second carrier type. The difference between the first set of overhead assumptions and the second set of overhead assumptions may include at least one of downlink control signaling or a common reference signal. The second set of overhead assumptions may be determined based on a subframe type.

The carrier type may be a new carrier type (e.g., LTE Rel-11 or later carrier type). Moreover, a first three symbols of a subframe of the new carrier type may not be occupied by control signaling.

Figure 12:
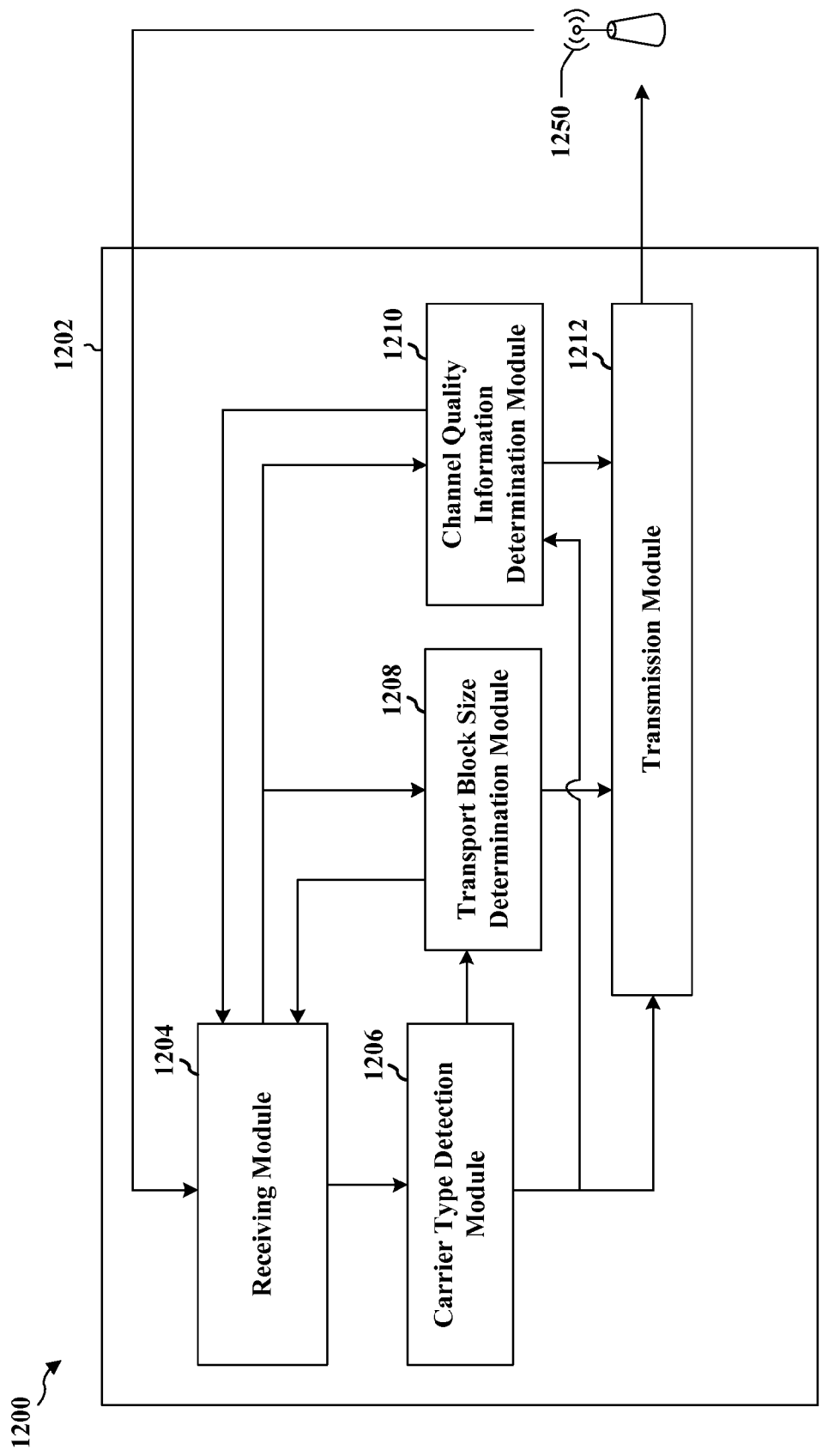
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a receiving module 1204, a carrier type detection module 1206, a transport block size determination module 1208, a channel quality information determination module 1210, and a transmission module 1212.

The carrier type detection module 1206 detects a carrier type for receiving a signal. In one example, the carrier type detection module 1206 may detect a carrier type using one or more of the techniques described above. The transport block size determination module 1208 determines a transport block size (TBS) based at least in part on the detected carrier type. The receiving module 1204 receives the signal according to the determined TBS.

The TBS may be determined based on a first scheme for a first detected carrier type, and determined based on a second scheme for a second detected carrier type. The first scheme may include at least a first TBS look-up table, and the second scheme may include at least a second TBS look-up table different from the first TBS look-up table. The first detected carrier type may be a legacy carrier type (e.g., LTE Rel-8/9/10 carrier type). The second detected carrier type may be a new carrier type (NCT) (e.g., LTE Rel-11 or later carrier type).

The second scheme for TBS determination may be automatically enabled for all user equipments (UEs) in a cell of the second carrier type. Alternatively, the second scheme for TBS determination may be enabled via a signal received by the receiving module 1204 in a cell of the second carrier type. The enabling signal may be a user equipment (UE)-specific signal or a cell-specific signal.

The determining of the TBS based at least in part on the detected carrier type may include determining a TBS scheme based on at least two different TBS schemes for a same subframe type in a cell. The subframe type may be at least one of a normal downlink subframe, a normal uplink subframe, or a special subframe, wherein the special subframe includes both downlink and uplink transmissions. The determining of the TBS scheme may be further based on at least one of a downlink control information (DCI) format, a control channel type, a signal received dynamically via a downlink control channel, a physical downlink scheduling channel (PDSCH) type, a modulation order of the PDSCH, whether the signal is a unicast signal or a multicast signal, whether the PDSCH is scheduled by a user equipment (UE)-specific search space or a common search space, or whether a subframe contains a common reference signal (CRS).

A first TBS scheme may be based on a resource allocation size and a modulation and coding scheme (MCS) value, and a second TBS scheme may be based on the resource allocation size, the MCS value, and an adjustment factor, as described above. The adjustment factor may be larger than 1. The second TBS scheme may include adjusting an assigned resource allocation size according to the adjustment factor, and determining the TBS according to the adjusted resource allocation size and the MCS value. Alternatively, the second TBS scheme may include determining a first TBS according to the resource allocation size and the MCS value, and calculating an adjusted TBS by applying the adjustment factor to the determined first TBS.

The receiving module 1204 may detect a carrier type for receiving a signal. In one example, the receiving module 1204 may detect a carrier type using one or more of the techniques described above. The channel quality information determination module 1210 may determine channel quality information (CQI) based at least in part on the detected carrier type. The transmission module 1212 may transmit the CQI to the eNB 1250.

The CQI may be determined based on a first set of overhead assumptions for a first detected carrier type, and determined based on a second set of overhead assumptions for a second detected carrier type. The difference between the first set of overhead assumptions and the second set of overhead assumptions may include at least one of downlink control signaling or a common reference signal. The second set of overhead assumptions may be determined based on a subframe type.

The carrier type may be a new carrier type (e.g., LTE Rel-11 or later carrier type). The CQI may be determined based on a first three symbols of a subframe of the new carrier type not being occupied by control signaling.

Figure 13:
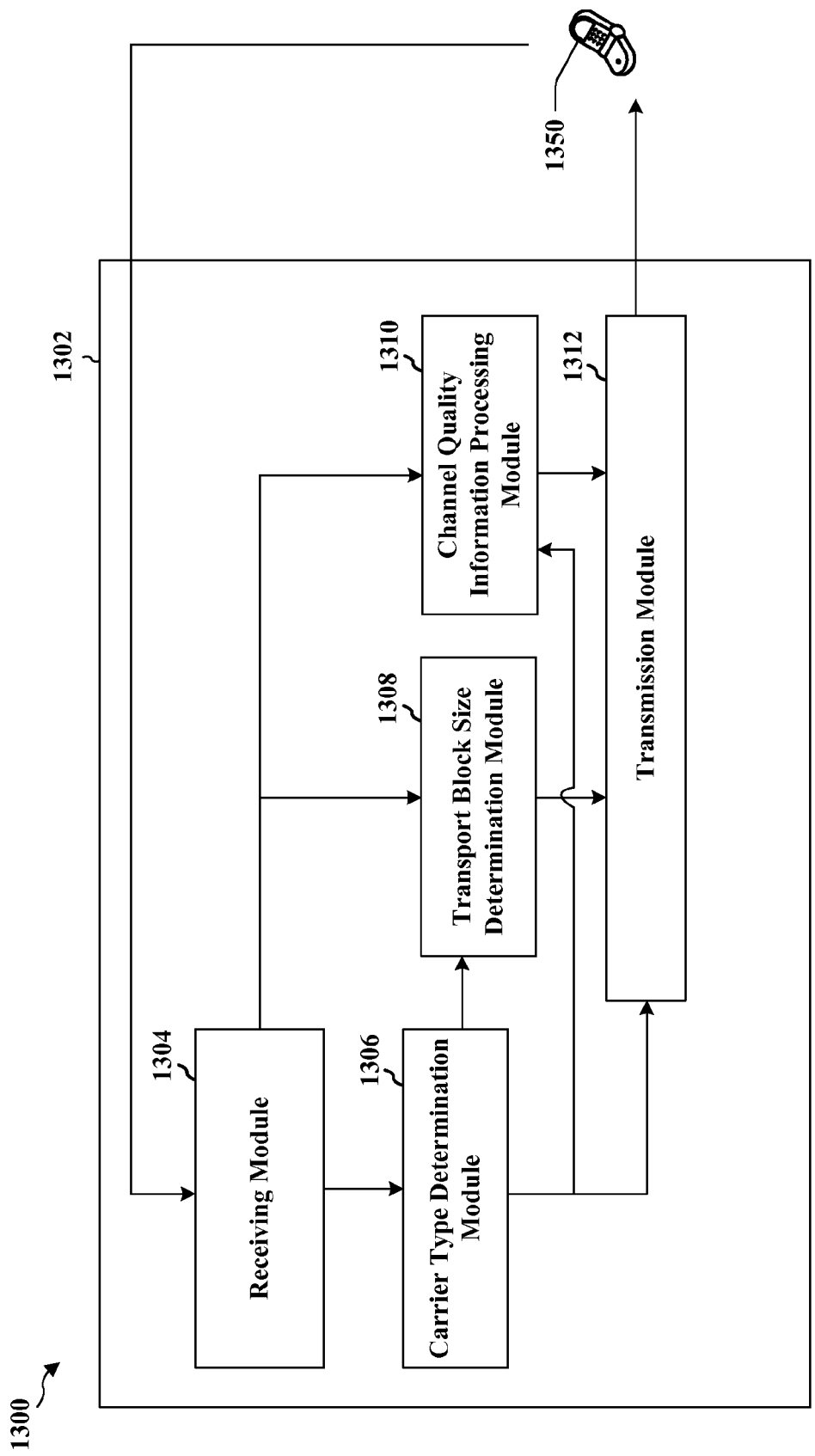
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be an eNB. The apparatus includes a receiving module 1304, a carrier type determination module 1306, a transport block size determination module 1308, a channel quality information processing module 1310, and a transmission module 1312.

The carrier type determination module 1306 may determine a carrier type for transmitting a signal. The transport block size determination module 1308 may determine a transport block size (TBS) based at least in part on the carrier type. The transmission module 1312 may transmit the signal according to the determined carrier type and TBS.

The TBS may be determined based on a first scheme for a first carrier type, and determined based on a second scheme for a second carrier type. The first scheme may include at least a first TBS look-up table, and the second scheme may include at least a second TBS look-up table different from the first TBS look-up table. The first carrier type may be a legacy carrier type (e.g., LTE Rel-8/9/10 carrier type). The second carrier type may be a new carrier type (NCT) (e.g., LTE Rel-11 or later carrier type). The second scheme for TBS determination may be automatically enabled for all user equipments (UEs) 1350 in a cell of the second carrier type.

The transmission module 1312 may transmit a signal in a cell of the second carrier type to enable the second scheme for TBS determination in a user equipment (UE) 1350. The enabling signal may be a UE-specific signal or a cell-specific signal.

The determining of the TBS based at least in part on the carrier type may include determining a TBS scheme based on at least two different TBS schemes for a same subframe type in a cell. The subframe type may be at least one of a normal downlink subframe, a normal uplink subframe, or a special subframe, wherein the special subframe includes both downlink and uplink transmissions. The determining of the TBS scheme may be further based on at least one of a downlink control information (DCI) format, a control channel type, a signal received dynamically via a downlink control channel, a physical downlink scheduling channel (PDSCH) type, a modulation order of the PDSCH, whether the signal is a unicast signal or a multicast signal, whether the PDSCH is scheduled by a user equipment (UE)-specific search space or a common search space, or whether a subframe contains a common reference signal (CRS).

A first TBS scheme may be based on a resource allocation size and a modulation and coding scheme (MCS) value. A second TBS scheme may be based on the resource allocation size, the MCS value, and an adjustment factor, as described above. The adjustment factor may be larger than 1. The second TBS scheme may include adjusting an assigned resource allocation size according to the adjustment factor, and determining the TBS according to the adjusted resource allocation size and the MCS value. Alternatively, the second TBS scheme may include determining a first TBS according to the resource allocation size and the MCS value, and calculating an adjusted TBS by applying the adjustment factor to the determined first TBS.

The carrier type determination module 1306 may determine a carrier type for transmitting a signal. The transmission module 1312 may transmit the signal according to the determined carrier type. Thereafter, the channel quality information processing module 1310 may receive channel quality information (CQI) via the receiving module 1304 from a user equipment (UE) 1350 based at least in part on the carrier type.

The CQI may be based on a first set of overhead assumptions for a first carrier type, and based on a second set of overhead assumptions for a second carrier type. The difference between the first set of overhead assumptions and the second set of overhead assumptions may include at least one of downlink control signaling or a common reference signal. The second set of overhead assumptions may be determined based on a subframe type.

The carrier type may be a new carrier type (e.g., LTE Rel-11 or later carrier type). Moreover, a first three symbols of a subframe of the new carrier type may not be occupied by control signaling.

The apparatus may include additional modules that perform each of the steps of the algorithm in the aforementioned flow charts of FIGS. 8-11. As such, each step in the aforementioned flow charts of FIGS. 8-11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
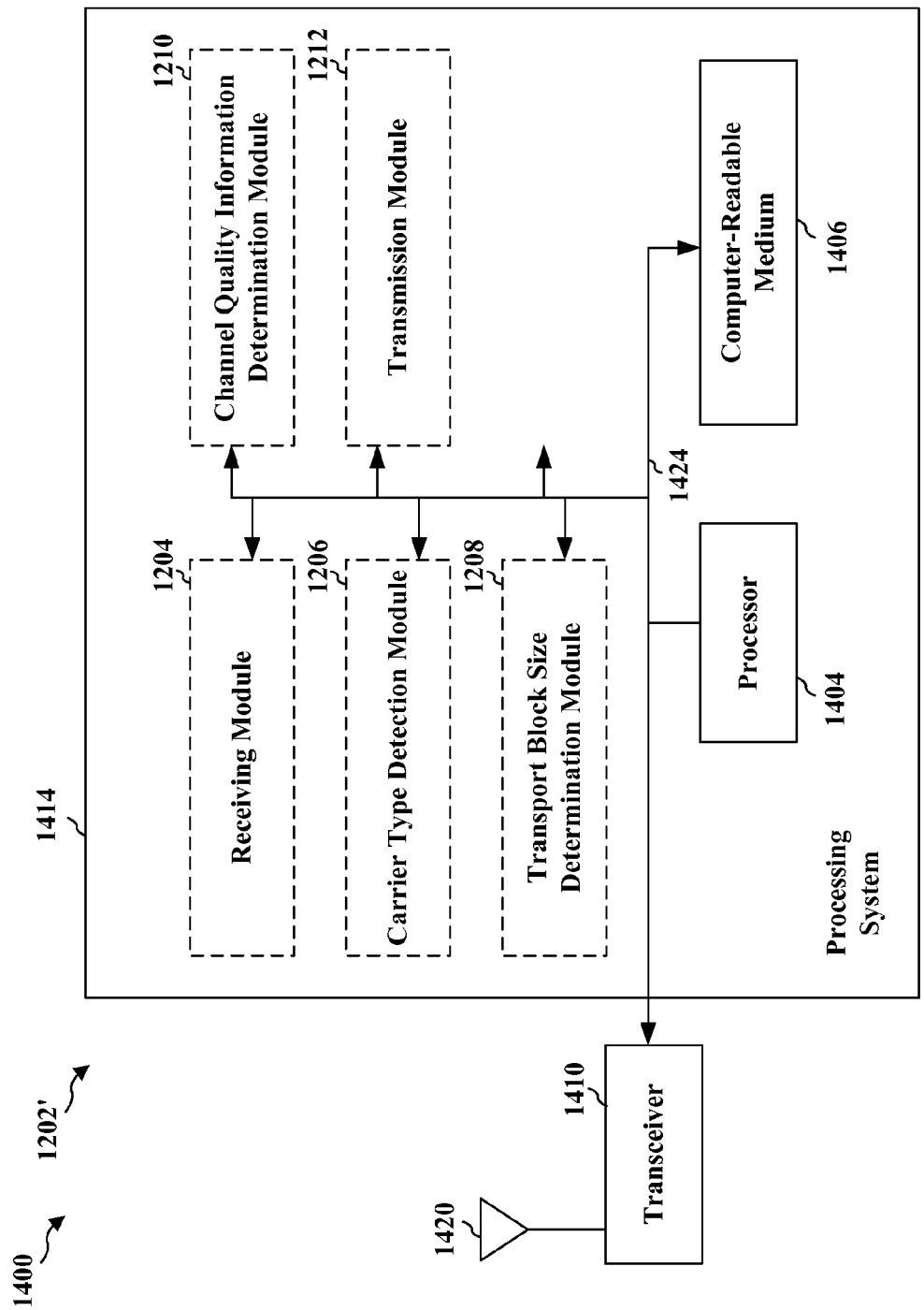
FIG. 14 is a diagram illustrating an example of a hardware implementation for an apparatus employing a processing system.

FIG. 14 is a diagram 1400 illustrating an example of a hardware implementation for an apparatus 1202' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1204, 1206, 1208, 1210, 1212, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1204, 1206, 1208, 1210 and 1212. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1202/1202' for wireless communication includes means for detecting a carrier type for receiving a signal, means for determining a transport block size (TBS) based at least in part on the detected carrier type, and means for receiving the signal according to the determined TBS, means for determining channel quality information (CQI) based at least in part on the detected carrier type, and means for transmitting the CQI.

The aforementioned means may be one or more of the aforementioned modules of the apparatus 1202 and/or the processing system 1414 of the apparatus 1202' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 15:
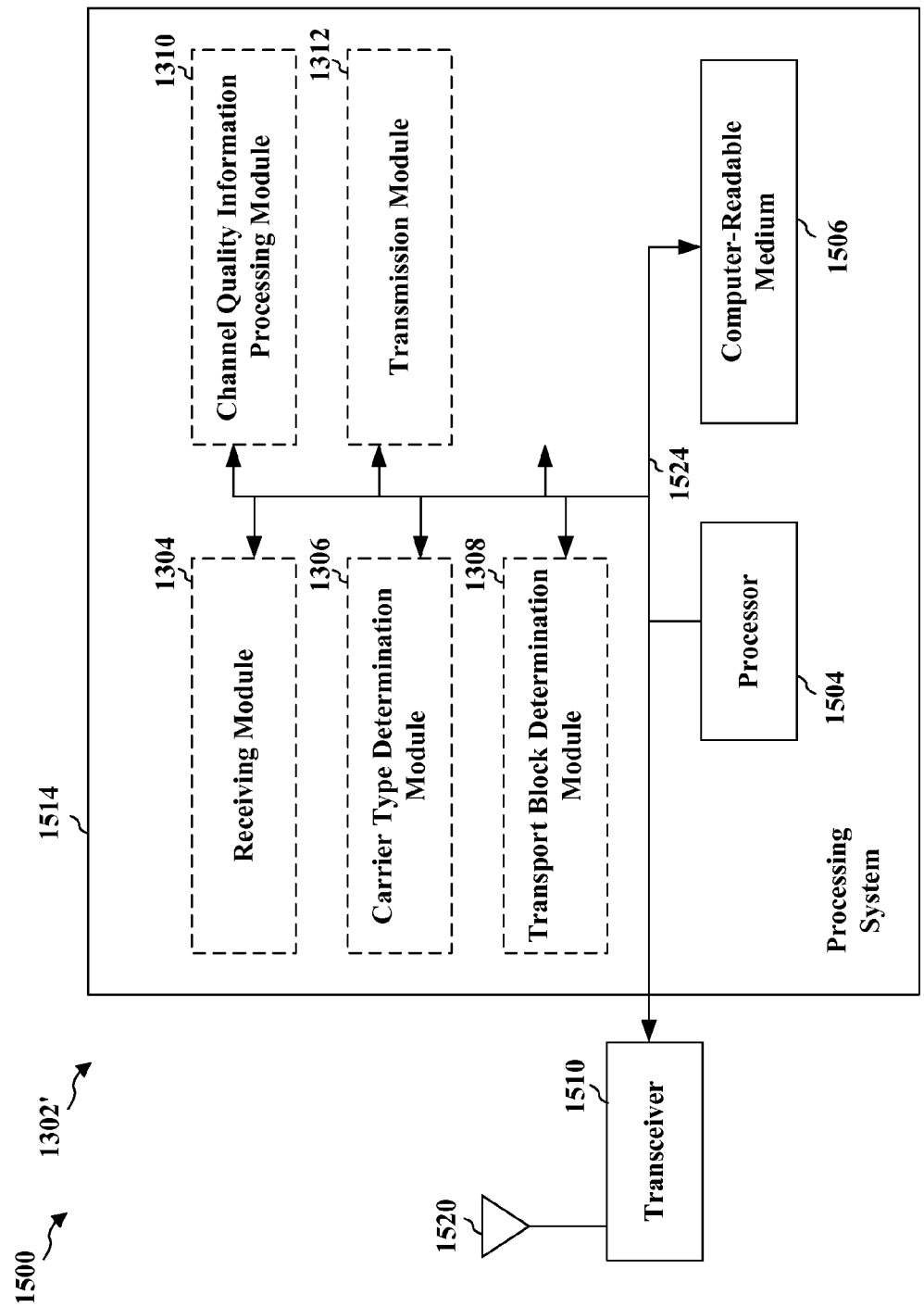
FIG. 15 is a diagram illustrating an example of a hardware implementation for an apparatus employing a processing system.

FIG. 15 is a diagram 1500 illustrating an example of a hardware implementation for an apparatus 1302' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1304, 1306, 1308, 1310, and 1312, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1304, 1306, 1308, 1310, and 1312. The modules may be software modules running in the processor 1504, resident/stored in the computer readable medium 1506, one or more hardware modules coupled to the processor 1504, or some combination thereof. The processing system 1514 may be a component of the eNB 610 and may include the memory 676 and/or at least one of the TX processor 616, the RX processor 670, and the controller/processor 675.

In one configuration, the apparatus 1302/1302' for wireless communication includes means for determining a carrier type for transmitting a signal, means for determining a transport block size (TBS) based at least in part on the carrier type, means for transmitting the signal according to the determined carrier type and TBS, means for transmitting the signal according to the determined carrier type, and means for receiving channel quality information (CQI) from a user equipment (UE) based at least in part on the carrier type.

The aforementioned means may be one or more of the aforementioned modules of the apparatus 1302 and/or the processing system 1514 of the apparatus 1302' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   detecting a carrier type from a plurality of carrier types for receiving a signal, the plurality of carrier types including a first carrier type having control signaling of a second carrier type in a data region of the first carrier type;
   determining a transport block size (TBS) based at least in part on the detected carrier type, wherein the determining of the TBS based at least in part on the detected carrier type comprises determining a TBS scheme based on at least two different TBS schemes for a same subframe type in a cell, the at least two different TBS schemes including a first TBS scheme based on a resource allocation size and a modulation and coding scheme (MCS) value, and a second TBS scheme based on the resource allocation size, the MCS value, a first adjustment factor associated with a first rank, and a second adjustment factor associated with a second rank; and
   receiving the signal according to the determined TBS.

2. The method of claim 1, wherein the TBS is determined based on the first TBS scheme for a first detected carrier type, and determined based on the second TBS scheme for a second detected carrier type.

3. The method of claim 2, wherein the first TBS scheme comprises at least a first TBS look-up table, and the second TBS scheme comprises at least a second TBS look-up table different from the first TBS look-up table.

4. The method of claim 2, wherein the first detected carrier type is a legacy carrier type, and the second detected carrier type is a new carrier type.

5. The method of claim 2, wherein the second TBS scheme for TBS determination is automatically enabled for all user equipments (UEs) in a cell of the second detected carrier type.

6. The method of claim 2, wherein the second TBS scheme for TBS determination is enabled via a signal in a cell of the second detected carrier type.

7. The method of claim 6, wherein the enabling signal is a user equipment (UE)-specific signal or a cell-specific signal.

8. The method of claim 1, wherein the subframe type comprises at least one of:
   a normal downlink subframe;
   a normal uplink subframe; or
   a special subframe comprising both downlink and uplink transmissions.

9. The method of claim 1, wherein the determining of the TBS scheme is further based on at least one of:
   a downlink control information (DCI) format;
   a control channel type;
   a signal received dynamically via a downlink control channel;
   a physical downlink scheduling channel (PDSCH) type;
   a modulation order of the PDSCH;
   whether the signal is a unicast signal or a multicast signal;
   whether the PDSCH is scheduled by a user equipment (UE)-specific search space or a common search space; or
   whether a subframe contains a common reference signal (CRS).

10. The method of claim 1, wherein the first adjustment factor and the second adjustment factor are larger than 1.

11. The method of claim 1, wherein the second TBS scheme comprises:
    adjusting an assigned resource allocation size according to at least one of the first adjustment factor or the second adjustment factor; and
    determining the TBS according to the adjusted resource allocation size and the MCS value.

12. The method of claim 1, wherein the second TBS scheme comprises:
    determining a first TBS according to the resource allocation size and the MCS value; and
    calculating an adjusted TBS by applying at least one of the first adjustment factor or the second adjustment factor to the determined first TBS.

13. A method of wireless communication, comprising:
    determining a carrier type from a plurality of carrier types for transmitting a signal, the plurality of carrier types including a first carrier type having control signaling of a second carrier type in a data region of the first carrier type;
    determining a transport block size (TBS) based at least in part on the carrier type, wherein the determining of the TBS based at least in part on the carrier type comprises determining a TBS scheme based on at least two different TBS schemes for a same subframe type in a cell, the at least two different TBS schemes including a first TBS scheme based on a resource allocation size and a modulation and coding scheme (MCS) value, and a second TBS scheme based on the resource allocation size, the MCS value, a first adjustment factor associated with a first rank, and a second adjustment factor associated with a second rank; and transmitting the signal according to the determined carrier type and TBS.

14. The method of claim 13, wherein the TBS is determined based on the first TBS scheme for a first determined carrier type, and determined based on the second TBS scheme for a second determined carrier type.

15. The method of claim 14, wherein the first TBS scheme comprises at least a first TBS look-up table, and the second TBS scheme comprises at least a second TBS look-up table different from the first TBS look-up table.

16. The method of claim 14, wherein the first determined carrier type is a legacy carrier type, and the second determined carrier type is a new carrier type.

17. The method of claim 14, wherein the second TBS scheme for TBS determination is automatically enabled for all user equipments (UEs) in a cell of the second determined carrier type.

18. The method of claim 14, further comprising transmitting a signal in a cell of the second determined carrier type to enable the second TBS scheme for TBS determination in a user equipment (UE).

19. The method of claim 18, wherein the enabling signal is a user equipment (UE)-specific signal or a cell-specific signal.

20. The method of claim 13, wherein the subframe type comprises at least one of:
a normal downlink subframe;
a normal uplink subframe; or
a special subframe comprising both downlink and uplink transmissions.

21. The method of claim 13, wherein the determining of the TBS scheme is further based on at least one of:
a downlink control information (DCI) format;
a control channel type;
a signal received dynamically via a downlink control channel;
a physical downlink scheduling channel (PDSCH) type;
a modulation order of the PDSCH;
whether the signal is a unicast signal or a multicast signal;
whether the PDSCH is scheduled by a user equipment (UE)-specific search space or a common search space; or
whether a subframe contains a common reference signal (CRS).

22. The method of claim 13, wherein the first adjustment factor and the second adjustment factor are larger than 1.

23. The method of claim 13, wherein the second TBS scheme comprises:
adjusting an assigned resource allocation size according to at least one of the first adjustment factor or the second adjustment factor; and
determining the TBS according to the adjusted resource allocation size and the MCS value.

24. The method of claim 13, wherein the second TBS scheme comprises:
determining a first TBS according to the resource allocation size and the MCS value; and
calculating an adjusted TBS by applying at least one of the first adjustment factor or the second adjustment factor to the determined first TBS.

25. An apparatus for wireless communication, comprising:
means for detecting a carrier type from a plurality of carrier types for receiving a signal, the plurality of carrier types including a first carrier type having control signaling of a second carrier type in a data region of the first carrier type;
means for determining a transport block size (TBS) based at least in part on the detected carrier type, wherein the means for determining the TBS based at least in part on the detected carrier type is configured to determine a TBS scheme based on at least two different TBS schemes for a same subframe type in a cell, the at least two different TBS schemes including a first TBS scheme based on a resource allocation size and a modulation and coding scheme (MCS) value, and a second TBS scheme based on the resource allocation size, the MCS value, a first adjustment factor associated with a first rank, and a second adjustment factor associated with a second rank; and
means for receiving the signal according to the determined TBS.

26. The apparatus of claim 25, wherein the TBS is determined based on the first TBS scheme for a first detected carrier type, and determined based on the second TBS scheme for a second detected carrier type.

27. The apparatus of claim 26, wherein the first TBS scheme comprises at least a first TBS look-up table, and the second TBS scheme comprises at least a second TBS look-up table different from the first TBS look-up table.

28. The apparatus of claim 26, wherein the first detected carrier type is a legacy carrier type, and the second detected carrier type is a new carrier type.

29. The apparatus of claim 26, wherein the second TBS scheme for TBS determination is automatically enabled for all user equipments (UEs) in a cell of the second detected carrier type.

30. The apparatus of claim 26, wherein the second TBS scheme for TBS determination is enabled via a signal in a cell of the second detected carrier type.

31. The apparatus of claim 30, wherein the enabling signal is a user equipment (UE)-specific signal or a cell-specific signal.

32. The apparatus of claim 25, wherein the subframe type comprises at least one of:
a normal downlink subframe;
a normal uplink subframe; or
a special subframe comprising both downlink and uplink transmissions.

33. The apparatus of claim 25, wherein the determining the TBS scheme is further based on at least one of:
a downlink control information (DCI) format;
a control channel type;
a signal received dynamically via a downlink control channel;
a physical downlink scheduling channel (PDSCH) type;
a modulation order of the PDSCH;
whether the signal is a unicast signal or a multicast signal;
whether the PDSCH is scheduled by a user equipment (UE)-specific search space or a common search space; or
whether a subframe contains a common reference signal (CRS).

34. The apparatus of claim 25, wherein the first adjustment factor and the second adjustment factor are larger than 1.

35. The apparatus of claim 25, wherein for the second TBS scheme, the means for determining the TBS is configured to:
    adjust an assigned resource allocation size according to at least one of the first adjustment factor or the second adjustment factor; and
    determine the TBS according to the adjusted resource allocation size and the MCS value.

36. The apparatus of claim 25, wherein for the second TBS scheme, the means for determining the TBS is configured to:
    determine a first TBS according to the resource allocation size and the MCS value; and
    calculate an adjusted TBS by applying at least one of the first adjustment factor or the second adjustment factor to the determined first TBS.

37. An apparatus for wireless communication, comprising:
    means for determining a carrier type from a plurality of carrier types for transmitting a signal, the plurality of carrier types including a first carrier type having control signaling of a second carrier type in a data region of the first carrier type;
    means for determining a transport block size (TBS) based at least in part on the carrier type, wherein the means for determining the TBS based at least in part on the carrier type is configured to determine a TBS scheme based on at least two different TBS schemes for a same subframe type in a cell, the at least two different TBS schemes including a first TBS scheme based on a resource allocation size and a modulation and coding scheme (MCS) value, and a second TBS scheme based on the resource allocation size, the MCS value, a first adjustment factor associated with a first rank, and a second adjustment factor associated with a second rank; and
    means for transmitting the signal according to the determined carrier type and TBS.

38. The apparatus of claim 37, wherein the TBS is determined based on the first TBS scheme for a first determined carrier type, and determined based on the second TBS scheme for a second determined carrier type.

39. The apparatus of claim 38, wherein the first TBS scheme comprises at least a first TBS look-up table, and the second TBS scheme comprises at least a second TBS look-up table different from the first TBS look-up table.

40. The apparatus of claim 38, wherein the first determined carrier type is a legacy carrier type, and the second determined carrier type is a new carrier type.

41. The apparatus of claim 38, wherein the second TBS scheme for TBS determination is automatically enabled for all user equipments (UEs) in a cell of the second determined carrier type.

42. The apparatus of claim 38, further comprising means for transmitting a signal in a cell of the second determined carrier type to enable the second TBS scheme for TBS determination in a user equipment (UE).

43. The apparatus of claim 42, wherein the enabling signal is a user equipment (UE)-specific signal or a cell-specific signal.

44. The apparatus of claim 37, wherein the subframe type comprises at least one of:
    a normal downlink subframe;
    a normal uplink subframe; or
    a special subframe comprising both downlink and uplink transmissions.

45. The apparatus of claim 37, wherein the determining the TBS scheme is further based on at least one of:
    a downlink control information (DCI) format;
    a control channel type;
    a signal received dynamically via a downlink control channel;
    a physical downlink scheduling channel (PDSCH) type;
    a modulation order of the PDSCH;
    whether the signal is a unicast signal or a multicast signal;
    whether the PDSCH is scheduled by a user equipment (UE)-specific search space or a common search space; or
    whether a subframe contains a common reference signal (CRS).

46. The apparatus of claim 37, wherein the first adjustment factor and the second adjustment factor are larger than 1.

47. The apparatus of claim 37, wherein for the second TBS scheme, the means for determining the TBS is configured to:
    adjust an assigned resource allocation size according to at least one of the first adjustment factor or the second adjustment factor; and
    determine the TBS according to the adjusted resource allocation size and the MCS value.

48. The apparatus of claim 37, wherein for the second TBS scheme, the means for determining the TBS is configured to:
    determine a first TBS according to the resource allocation size and the MCS value; and
    calculate an adjusted TBS by applying at least one of the first adjustment factor or the second adjustment factor to the determined first TBS.

49. An apparatus for wireless communication, comprising:
    a memory; and
    at least one processor coupled to the memory and configured to:
        detect a carrier type from a plurality of carrier types for receiving a signal, the plurality of carrier types including a first carrier type having control signaling of a second carrier type in a data region of the first carrier type;
        determine a transport block size (TBS) based at least in part on the detected carrier type; and
        receive the signal according to the determined TBS,
    wherein, to determine the TBS based at least in part on the detected carrier type, the at least one processor is configured to determine a TBS scheme based on at least two different TBS schemes for a same subframe type in a cell, the at least two different TBS schemes including a first TBS scheme based on a resource allocation size and a modulation and coding scheme (MCS) value, and a second TBS scheme based on the resource allocation size, the MCS value, a first adjustment factor associated with a first rank, and a second adjustment factor associated with a second rank.

50. The apparatus of claim 49, wherein the TBS is determined based on the first TBS scheme for a first detected carrier type, and determined based on the second TBS scheme for a second detected carrier type.

51. The apparatus of claim 50, wherein the first TBS scheme comprises at least a first TBS look-up table, and the second TBS scheme comprises at least a second TBS look-up table different from the first TBS look-up table.

52. The apparatus of claim 50, wherein the first detected carrier type is a legacy carrier type, and the second detected carrier type is a new carrier type.

53. The apparatus of claim 50, wherein the second TBS scheme for TBS determination is automatically enabled for all user equipments (UEs) in a cell of the second detected carrier type.

54. The apparatus of claim 50, wherein the second TBS scheme for TBS determination is enabled via a signal in a cell of the second detected carrier type.

55. The apparatus of claim 54, wherein the enabling signal is a user equipment (UE)-specific signal or a cell-specific signal.

56. The apparatus of claim 49, wherein the subframe type comprises at least one of:
   a normal downlink subframe;
   a normal uplink subframe; or
   a special subframe comprising both downlink and uplink transmissions.

57. The apparatus of claim 49, wherein the at least one processor further determines the TBS scheme based on at least one of:
   a downlink control information (DCI) format;
   a control channel type;
   a signal received dynamically via a downlink control channel;
   a physical downlink scheduling channel (PDSCH) type;
   a modulation order of the PDSCH;
   whether the signal is a unicast signal or a multicast signal;
   whether the PDSCH is scheduled by a user equipment (UE)-specific search space or a common search space; or
   whether a subframe contains a common reference signal (CRS).

58. The apparatus of claim 49, wherein the first adjustment factor and the second adjustment factor are larger than 1.

59. The apparatus of claim 49, wherein for the second TBS scheme, the at least one processor is configured to:
   adjust an assigned resource allocation size according to at least one of the first adjustment factor or the second adjustment factor; and
   determine the TBS according to the adjusted resource allocation size and the MCS value.

60. The apparatus of claim 49, wherein for the second TBS scheme, the at least one processor is configured to:
   determine a first TBS according to the resource allocation size and the MCS value; and
   calculate an adjusted TBS by applying at least one of the first adjustment factor or the second adjustment factor to the determined first TBS.

61. An apparatus for wireless communication, comprising:
   a memory; and
   at least one processor coupled to the memory and configured to:
      determine a carrier type from a plurality of carrier types for transmitting a signal, the plurality of carrier types including a first carrier type having control signaling of a second carrier type in a data region of the first carrier type;
      determine a transport block size (TBS) based at least in part on the carrier type; and
      transmit the signal according to the determined carrier type and TBS;
   wherein, to determine the TBS based at least in part on the carrier type, the at least one process is configured to determine a TBS scheme based on at least two different TBS schemes for a same subframe type in a cell, the at least two different TBS schemes including a first TBS scheme based on a resource allocation size and a modulation and coding scheme (MCS) value, and a second TBS scheme based on the resource allocation size, the MCS value, a first adjustment factor associated with a first rank, and a second adjustment factor associated with a second rank.

62. The apparatus of claim 61, wherein the TBS is determined based on the first TBS scheme for a first determined carrier type, and determined based on the second TBS scheme for a second determined carrier type.

63. The apparatus of claim 62, wherein the first TBS scheme comprises at least a first TBS look-up table, and the second TBS scheme comprises at least a second TBS look-up table different from the first TBS look-up table.

64. The apparatus of claim 62, wherein the first determined carrier type is a legacy carrier type, and the second determined carrier type is a new carrier type.

65. The apparatus of claim 62, wherein the second TBS scheme for TBS determination is automatically enabled for all user equipments (UEs) in a cell of the second determined carrier type.

66. The apparatus of claim 62, the at least one processor further configured to transmit a signal in a cell of the second determined carrier type to enable the second TBS scheme for TBS determination in a user equipment (UE).

67. The apparatus of claim 66, wherein the enabling signal is a user equipment (UE)-specific signal or a cell-specific signal.

68. The apparatus of claim 61, wherein the subframe type comprises at least one of:
   a normal downlink subframe;
   a normal uplink subframe; or
   a special subframe comprising both downlink and uplink transmissions.

69. The apparatus of claim 61, wherein the at least one processor further determines the TBS scheme based on at least one of:
   a downlink control information (DCI) format;
   a control channel type;
   a signal received dynamically via a downlink control channel;
   a physical downlink scheduling channel (PDSCH) type;
   a modulation order of the PDSCH;
   whether the signal is a unicast signal or a multicast signal;
   whether the PDSCH is scheduled by a user equipment (UE)-specific search space or a common search space; or
   whether a subframe contains a common reference signal (CRS).

70. The apparatus of claim 61, wherein the first adjustment factor and the second adjustment factor are larger than 1.

71. The apparatus of claim 61, wherein for the second TBS scheme, the at least one processor is configured to:
   adjust an assigned resource allocation size according to at least one of the first adjustment factor or the second adjustment factor; and
   determine the TBS according to the adjusted resource allocation size and the MCS value.

72. The apparatus of claim 61, wherein for the second TBS scheme, the at least one processor is configured to:
   determine a first TBS according to the resource allocation size and the MCS value; and
   calculate an adjusted TBS by applying at least one of the first adjustment factor or the second adjustment factor to the determined first TBS.

73. A non-transitory computer-readable medium storing computer executable code for wireless communication, comprising code for:

detecting a carrier type from a plurality of carrier types for receiving a signal, the plurality of carrier types including a first carrier type having control signaling of a second carrier type in a data region of the first carrier type;

determining a transport block size (TBS) based at least in part on the detected carrier type; and receiving the signal according to the determined TBS, wherein the code for determining the TBS based at least in part on the detected carrier type is configured to determine a TBS scheme based on at least two different TBS schemes for a same subframe type in a cell, the at least two different TBS schemes including a first TBS scheme based on a resource allocation size and a modulation and coding scheme (MCS) value, and a second TBS scheme based on the resource allocation size, the MCS value, a first adjustment factor associated with a first rank, and a second adjustment factor associated with a second rank.

74. A non-transitory computer-readable medium storing computer executable code for wireless communication, comprising code for:

determining a carrier type from a plurality of carrier types for transmitting a signal, the plurality of carrier types including a first carrier type having control signaling of a second carrier type in a data region of the first carrier type;

determining a transport block size (TBS) based at least in part on the carrier type; and transmitting the signal according to the determined carrier type and TBS, wherein the code for determining the TBS based at least in part on the carrier type is configured to determine a TBS scheme based on at least two different TBS schemes for a same subframe type in a cell, the at least two different TBS schemes including a first TBS scheme based on a resource allocation size and a modulation and coding scheme (MCS) value, and a second TBS scheme based on the resource allocation size, the MCS value, a first adjustment factor associated with a first rank, and a second adjustment factor associated with a second rank.

* * * * *